(12) United States Patent
Itsuji et al.

(10) Patent No.: US 7,068,904 B2
(45) Date of Patent: Jun. 27, 2006

(54) OPTICAL ELEMENT WITH PERIODIC STRUCTURE

(75) Inventors: Takeaki Itsuji, Kanagawa (JP); Junichi Seki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/522,226

(22) PCT Filed: Sep. 29, 2003

(86) PCT No.: PCT/JP03/12422

§ 371 (c)(1),
(2), (4) Date: Jan. 24, 2005

(87) PCT Pub. No.: WO2004/031819

PCT Pub. Date: Apr. 15, 2004

(65) Prior Publication Data

US 2005/0244122 A1    Nov. 3, 2005

(30) Foreign Application Priority Data

Oct. 1, 2002 (JP) ............... 2002-288642

(51) Int. Cl.
*G02B 6/00* (2006.01)
*G02B 6/02* (2006.01)
*G02B 6/10* (2006.01)
*G02B 6/28* (2006.01)
*G02B 6/32* (2006.01)
*G02B 26/08* (2006.01)
*G02F 1/295* (2006.01)
*G02F 1/29* (2006.01)

(52) U.S. Cl. ............... 385/129; 385/4; 385/8; 385/123; 385/124; 385/125; 385/130; 385/131; 385/132; 385/147; 359/298; 359/315

(58) Field of Classification Search ............... 385/4, 385/8, 123–125, 129–132, 147; 359/298, 359/315
See application file for complete search history.

(56) References Cited

U.S. PATENT DOCUMENTS

2002/0021878 A1   2/2002   Allan et al. ............... 385/129
2002/0048422 A1*  4/2002   Cotteverte et al. ......... 385/4

(Continued)

FOREIGN PATENT DOCUMENTS

EP    1 243 966 A2    9/2002

(Continued)

OTHER PUBLICATIONS

Sungwon Kim et al., "Strain-Tunable Photonic Band Gap Crystals," 78(20) *Appl. Phys. Lett.* 3015-17 (May 2001).

(Continued)

*Primary Examiner*—Brian Healy
*Assistant Examiner*—Jerry Martin Blevins
(74) *Attorney, Agent, or Firm*—Fitzpatrick, Cella, Harper & Scinto

(57) ABSTRACT

An optical element comprising a periodic structure in which a refractive index is distributed periodically and a deforming portion, which mechanically deforms by an external action, wherein the deforming portion is integrally arranged with the periodic structure along the periodic direction of the periodic structure, and is constructed so as to change the periodicity of the periodic structure by deforming in the periodic direction of the periodic structure. A periodicity of the periodic structure (photonic band structure) in which the refractive index changes periodically can be controlled with a simple configuration.

19 Claims, 5 Drawing Sheets

U.S. PATENT DOCUMENTS

| | | |
|---|---|---|
| 2002/0135863 A1 | 9/2002 | Fukshima et al. ........... 359/298 |
| 2004/0012840 A1 | 1/2004 | Takiguchi et al. .......... 359/321 |

FOREIGN PATENT DOCUMENTS

| | | |
|---|---|---|
| JP | 10-253829 | 9/1998 |
| JP | 2000-66002 | 3/2000 |
| JP | 2001-91911 | 4/2001 |
| WO | WO 02/14913 A1 | 2/2002 |
| WO | WO 02/27384 A1 | 4/2002 |

OTHER PUBLICATIONS

Eli Yablonovitch, "Inhibited Spontaneous Emission in Solid-State Physics and Electronics," 58(20) *Phys. Rev. Lett.* 2059-62 (May 1987).

* cited by examiner

FIG. 1
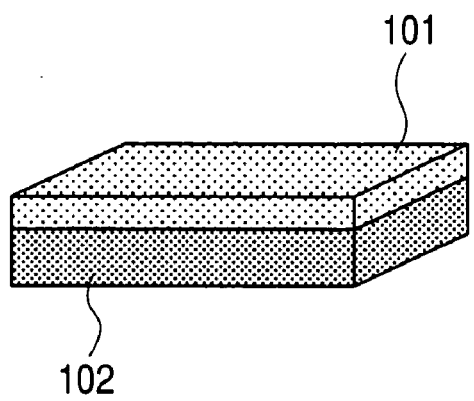
FIG. 2
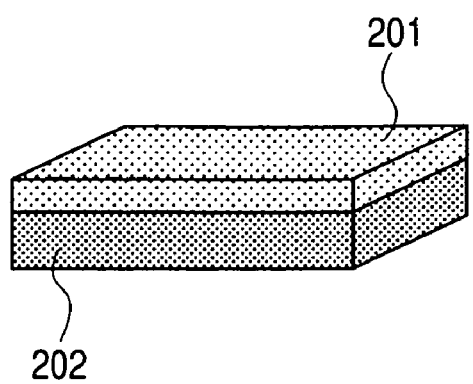
FIG. 3A
FIG. 3B
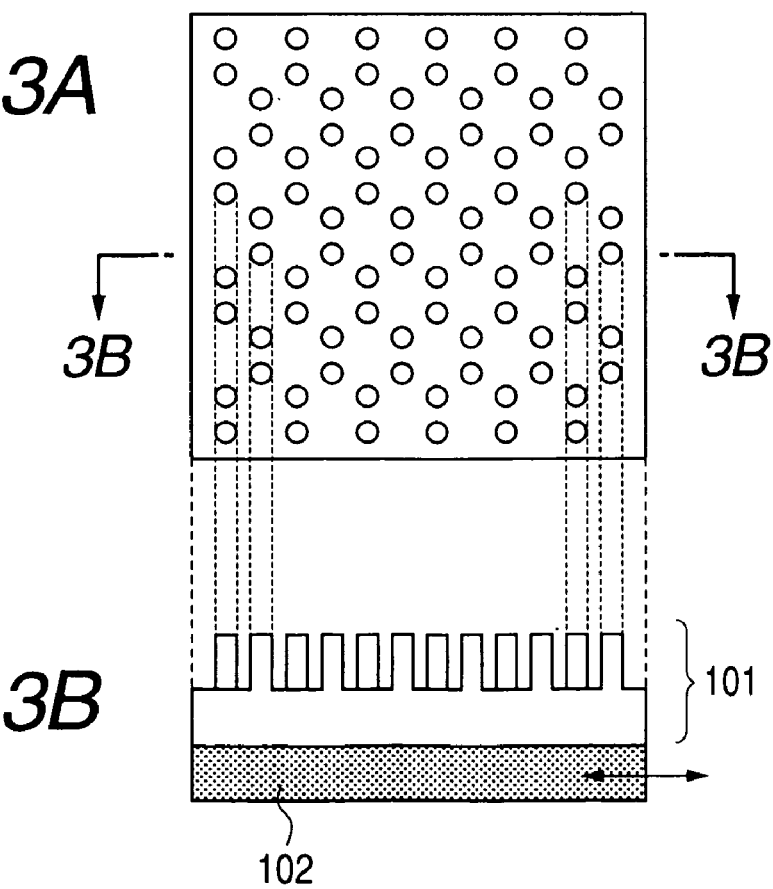

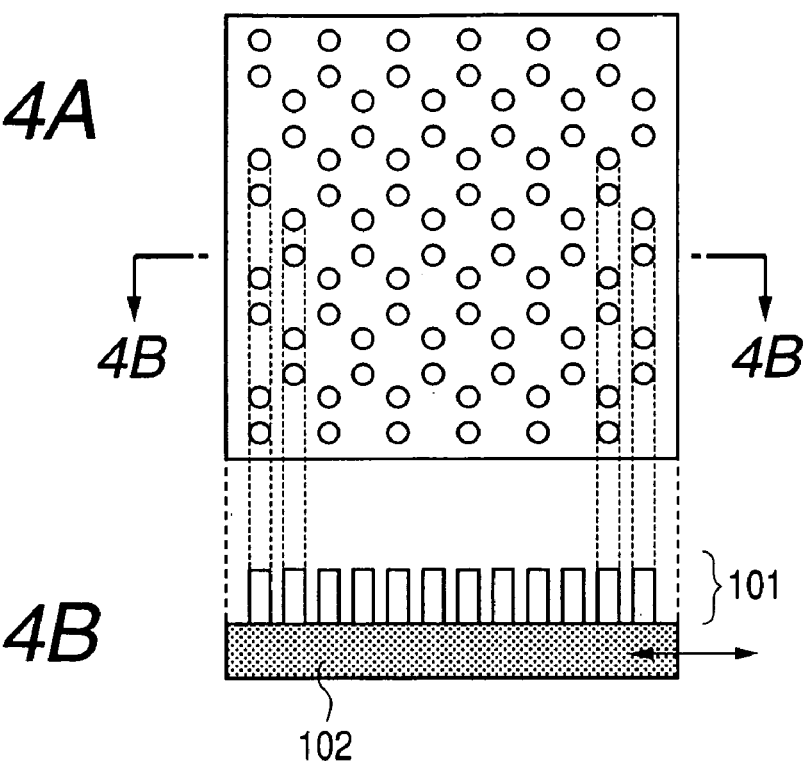
FIG. 4A
FIG. 4B
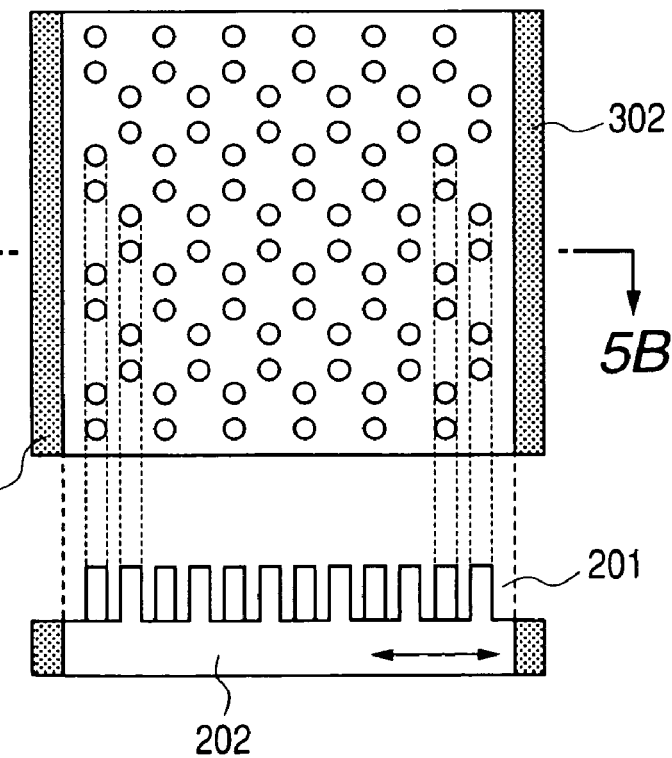
FIG. 5A
FIG. 5B

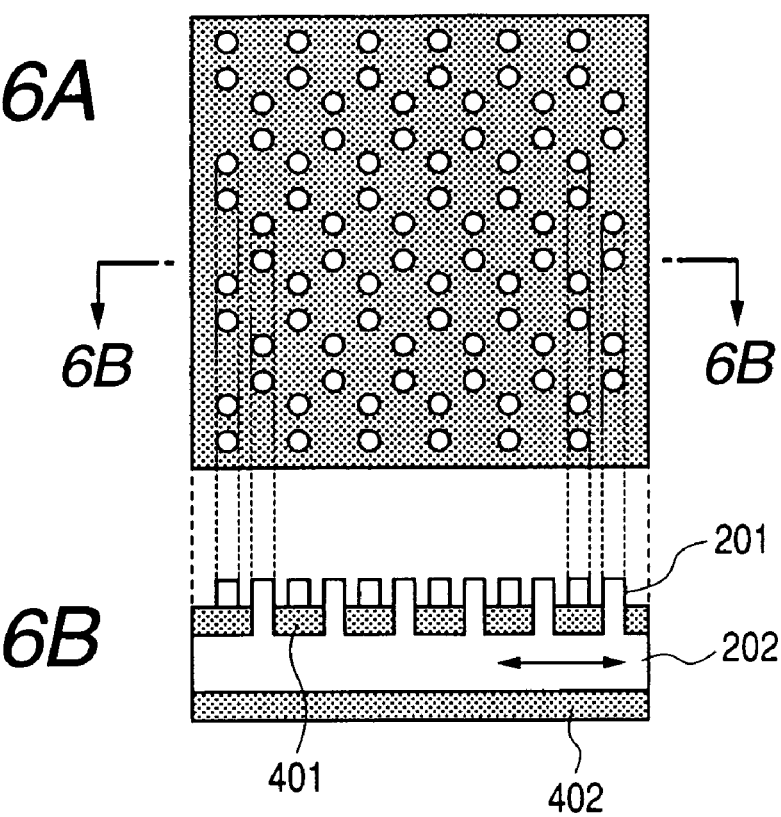
FIG. 6A
FIG. 6B
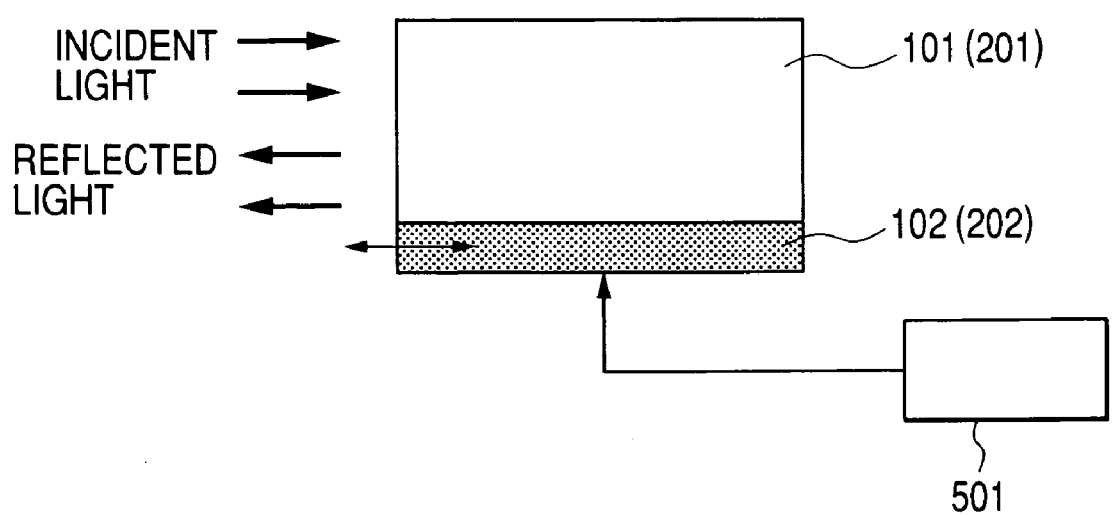
FIG. 7

OPTICAL ELEMENT WITH PERIODIC STRUCTURE

TECHNICAL FIELD

The present invention relates to an optical element having a periodic structure, and more particularly to a method for controlling the periodicity of a multi-dimensional periodic structure showing a periodic change in refractive index and an optical element comprising means which controls the periodicity of such periodic structure.

BACKGROUND ART

Recently, a new artificial crystal called "photonic crystal", in which materials of different refractive indexes are arranged periodically with a pitch equivalent to wavelength, is proposed and is attracting attention (E. Yablonovitch, Phys. Rev. Lett., 58(1987) 2059–2062). Active research is being conducted and developments are being made on such artificial crystal for an application as an optical element, because it has an optical inhibition band (photonic band gap) resulting from the so-called photonic band structure similar to a band structure in a semiconductor, and it also has a specific effect resulting from an apparent abnormality in the refractive index (Japanese Patent Application Laid-Open No. 2000-066002).

Because of such a background, a technology for precisely controlling the periodicity of the artificial crystal is becoming important for controlling the photonic band structure.

In such technical field, there has been proposed a method of positioning actuators around a fiber, diffraction grating and extending or contracting such actuators to apply a tension to the fiber thereby controlling the distribution of refractive index within the fiber (cf. Japanese Patent Application Laid-Open No. H10-253829).

Also, there has been proposed a method of introducing a substance of which the refractive index or the transmittance is externally controllable (for example a piezoelectric element) into the crystal, and causing elongation or contraction in such substance or a change of the characteristics thereof, thereby disturbing the periodicity of the crystal (cf. Japanese Patent Application Laid-Open No. 2001-091911).

Also, there has been proposed a method of applying an external pressure to the photonic crystal, thereby controlling the pitch of a lattice (cf. WO 02/27384).

However, these prior technologies are associated with the following drawbacks.

The method of extending or contracting the optical fiber changes a one-dimensional periodic structure arranged in the incident direction of light and requires a member for generating an extending-contracting force, such as a piezoelectric element, and also a transmission member for transmitting such force to the fiber, and the control accuracy of the lattice pitch is influenced by the material, arrangement, connection state etc. of such transmission member.

Also, the aforementioned apparent abnormality in the refractive index appears in a periodic structure of two or more dimensions, and the apparatus becomes more complex in order to apply forces in two or more directions through the transmission member.

Furthermore, the method of incorporating means for disturbing the crystal structure within the photonic crystal is associated with drawbacks in that the manufacture is complex, requiring a large number of process steps and that the usable material is considerably limited.

In addition, in the method of applying an external pressure to the photonic crystal for varying the crystal structure thereof, it is necessary, as shown in FIG. 8, to support a photonic crystal 602 and a piezoelectric element 603 with a support member 601 in surrounding manner. Consequently, the apparatus becomes bulky.

Therefore, the present invention is to provide a method for controlling a periodic structure, capable of overcoming the aforementioned drawbacks and enabling to control a periodic structure, which shows a periodic change in the refractive index (photonic band structure) with a simple configuration, and an optical element having a periodic structure control means.

DISCLOSURE OF THE INVENTION

The present invention is constructed as follows.

Initially, an optical element of the present invention includes a periodic structure in which a refractive index is distributed periodically, and a deforming portion, which is mechanically deformed by the exterior action. In particular, the deforming portion is integrally arranged with the periodic structure along a direction of periodicity thereof in such a manner as to change the periodicity of the periodic structure by deformation in the direction of periodicity of the periodic structure.

Such change in the periodicity is a change in the period, phase, duty, orientation or combination thereof.

The optical element of the present invention reflects an incident light having a wavelength within a predetermined range and transmits the other light. A light inside the optical element propagates in the region of periodicity of the aforementioned periodic structure. The aforementioned deforming portion is preferably positioned outside such light propagating region so as not to intercept the light propagation.

The deforming portion is preferably a member integrally adjoined to the periodic structure or is formed by the same member as the periodic structure, supports the periodic structure and deforms in the direction parallel to the joint interface or boundary plane with the periodic structure.

The optical element of the present invention causes mechanical deformation in the deforming portion by an electrical, mechanical or other external force, and is applicable, utilizing a resulting change in the aforementioned optical property, to a mirror having a variable reflecting direction or a light deflector causing a change of the angle of a light exit direction with respect to a light incident direction.

Also, a control method for an optical element of the present invention is a method for controlling an optical element including a periodic structure in which the refractive index is distributed periodically, characterized by arranging a deforming portion, which is mechanically deformed by the exterior action, integrally with the periodic structure along the direction of periodicity of the periodic structure, and causing a deformation in the direction of periodicity of the periodic structure, thereby changing the periodicity of the periodic structure.

BRIEF DESCRIPTION OF THE DRAWINGS

FIG. 1 is a view of an optical element according to the first embodiment of the present invention.

FIG. 2 is a view of an optical element according to the second embodiment of the present invention.

FIGS. 3A and 3B are views of an optical element according to Example 1 of the present invention.

FIGS. 4A and 4B are views of another configuration of the optical element in Example 1 of the present invention.

FIGS. 5A and 5B are views of an optical element according to Example 2 of the present invention.

FIGS. 6A and 6B are views of another configuration of the optical element in Example 2 of the present invention.

FIG. 7 is a view showing an example of a configuration of a mirror utilizing an optical element of the present invention.

BEST MODE FOR CARRYING OUT THE INVENTION

Figure 8:
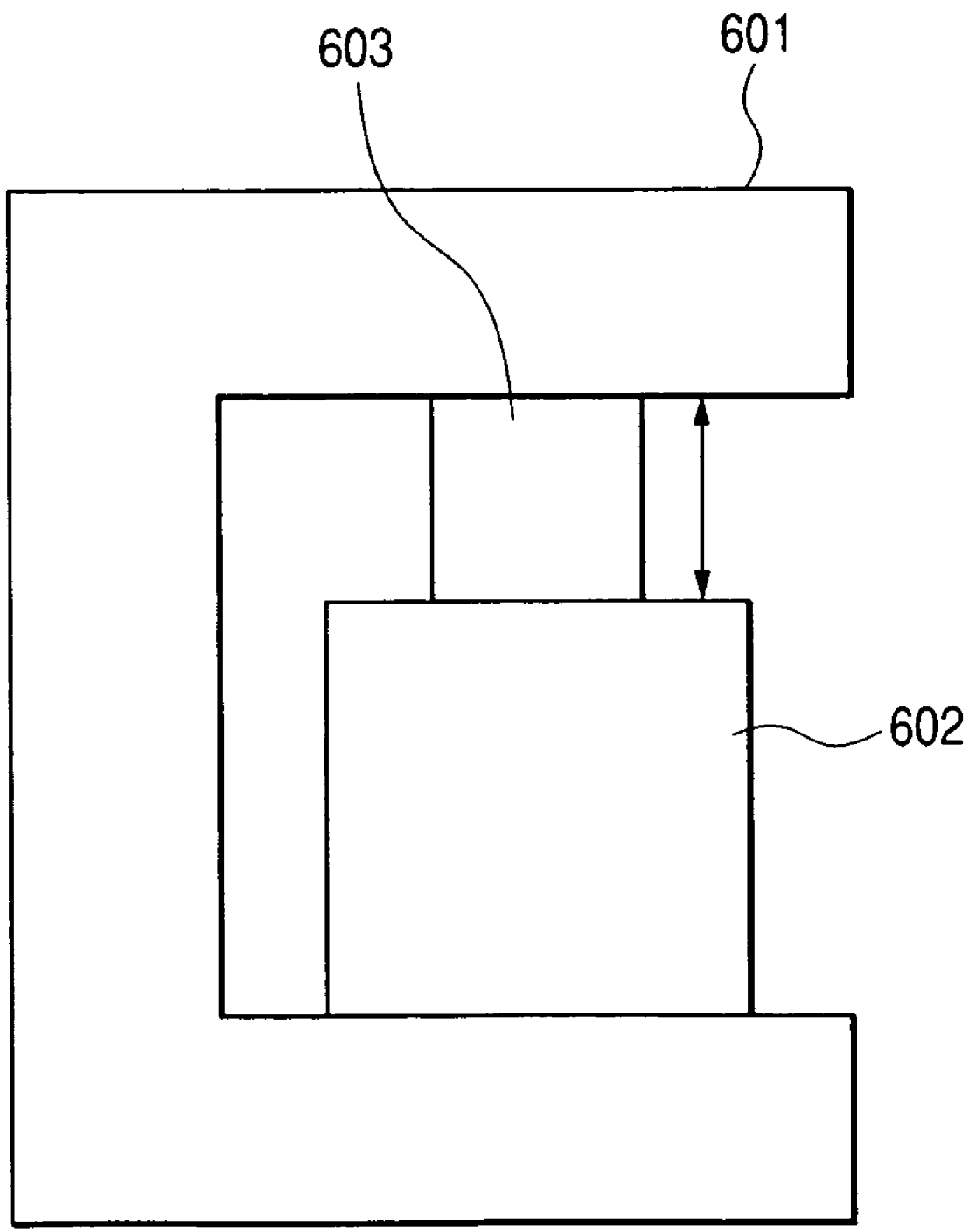
FIG. 8 is a view showing a prior example.

Embodiments of the present invention will be explained with reference to the accompanying drawings. In the following explanation of the drawings, and in the Examples, the same components are indicated by the same symbols.

FIG. 1 is a view showing a configuration of an optical element, for explaining a first embodiment of the present invention.

As shown in FIG. 1, the optical element of the present embodiment is constituted of a photonic crystal (hereinafter referred to as PC) 101, and a substrate 102. The PC 101 has a multi-dimensional periodic structure showing a periodic change of the refractive index. A crystal structure having such multi-dimensional periodic structure is not particularly restricted as long as there is a photonic band structure capable of suppressing light propagation.

The PC 101 can be prepared by an already reported and known method, such as lithography, etching, a self-forming method, such as an opal method, or micromachining, and the method of preparation is not particularly limited. The substrate 102 is constituted of a substance, which changes its shape by externally applied energy. After the PC 101 is prepared, it is closely adhered to the substrate 102, thereby providing the optical element.

As explained in the foregoing, the optical element of the present embodiment is such that the PC 101 is integrated on the substrate 102. Therefore, when the substrate 102 causes a deformation (mechanical deformation) by externally applied energy, the shape of the PC 101 correspondingly deforms integrally with the substrate 102. Thus, the substrate constitutes a deforming portion for mechanically deforming the periodic structure, and the deformation in the substrate itself integrally changes the periodicity of the periodic structure.

Such deformation in the shape of the PC 101 integral with the mechanical deformation of the substrate allows to change the lattice shape or lattice pitch in the crystal structure (multi-dimensional periodic structure). Such change in the lattice shape or in the lattice pitch includes not only a change in the pitch, or the period itself, of the lattice, but also a deformation of the shape of individual lattices. The change in the lattice shape includes a change of the phase of the periodic structure and the change in distribution of refractive index within a period, namely the duty. It is also possible, as will be explained in the following, to change the orientation of the lattice by shear deformation.

A light entering one end of the PC 101 is reflected when the frequency is within the inhibition band, but proceeds along the periodic structure when the frequency is outside the inhibition band. In the absence of an anomaly in the refractive index, the light is emitted from the other end of the PC, while in the presence of an anomaly in the refractive index, the proceeding direction is changed, but the light path remains within a plane of the same periodic structure. In either case, the deforming portion (substrate 102), being positioned outside the plane of the two-dimensional periodic structure, does not hinder the light path. Therefore, it need not be formed of a transparent member. Also, even if it is made of a piezoelectric member, an electrode material need not be transparent.

Since the frequency of the light corresponding to the photonic band structure can be determined from the lattice shape and the lattice pitch mentioned above, such change in the shape of the PC 101 allows to change the lattice shape or the lattice pitch, thereby controlling the frequency characteristics. FIGS. 9A to 9E show examples of the deformation in the periodic structure of the PC 101 in the present embodiment. FIGS. 9A to 9E are plan views of the optical element shown in FIG. 1, showing a two-dimensional periodic structure within a plane, in which the refractive index within circular cylinders arranged in a tetragonal lattice is different from that in the surrounding area. It is assumed that the light enters the PC 101 from the left-hand side of the drawing.

Figure 9A:
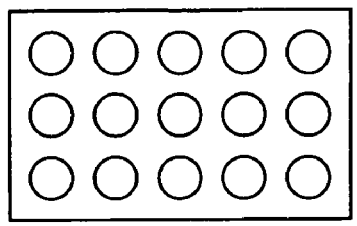
FIGS. 9A, 9B, 9C, 9D and 9E are views showing examples of deformation of the optical element of the present invention.
Figure 9B:
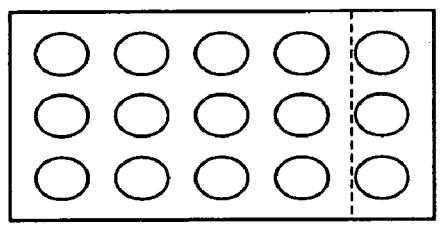
Figure 9C:
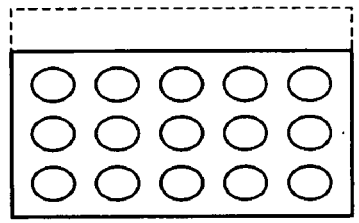
Figure 9D:
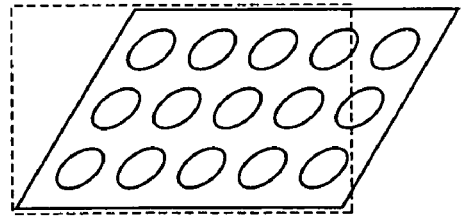
Figure 9E:
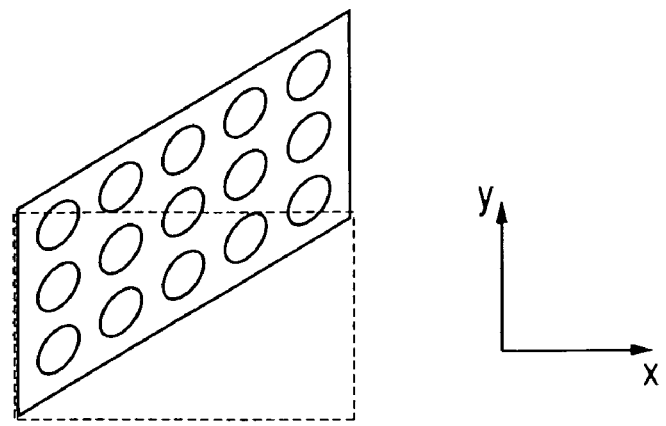

FIG. 9A shows a state without deformation; FIG. 9B shows a state elongated in the x-direction; FIG. 9C shows a state contracted in the y-direction; FIG. 9D shows a state with a shear deformation in the x-direction; and FIG. 9E shows a state with a shear deformation in the y-direction. In FIGS. 9B and 9C, the lattice pitch or the period is changed respectively in the x-direction and in the y-direction, and in FIGS. 9D and 9E, the lattice shape changes from the tetragonal lattice to the orthorhombic lattice. At the same time, the cross-section of the cylinders changes to an oval shape, whereby a change occurs not only in the lattice pitch and the lattice shape, but also in the refractive index distribution within a period (i.e., duty). Such changes in the periodicity change the photonic band structure, thereby causing variations in the optical characteristics, such as reflection and refraction for the incident light and in the frequency characteristics thereof. In the photonic crystal of the present invention, the change in the periodicity may appear in one or more of the lattice pitch, the lattice shape and the refractive index distribution.

Thus, the optical element of the present embodiment can control the lattice shape or the lattice pitch of the crystal by an exterior action, more specifically energy, such as a mechanical force or an electric field applied from the exterior, whereby an element having a desired photonic band structure can be provided with a simple configuration. Since the present embodiment can be realized with a simple element configuration in which an existing photonic crystal is fixed on a substrate deformable by an externally applied energy, there can be obtained a compact apparatus configuration. Also, there is a large freedom in selecting the shape and the material of the photonic crystal, and the photonic band structure can be regulated with a compact configuration. Further, since in such regulating operation the substrate itself is moved by the externally applied energy, it is possible to increase the response speed of the element.

In the following, there will be explained a second embodiment of the present invention.

FIG. 2 is a view showing an element configuration of an optical element for explaining a second embodiment of the present invention.

As shown in FIG. 2, the optical element of the present embodiment is constituted of a photonic crystal portion (hereinafter represented as PC portion) 201 and a support portion 202. The PC 201 has a multi-dimensional periodic structure showing a periodic change of refractive index. A crystal structure having such multi-dimensional periodic structure is not particularly restricted as long as there is formed a photonic band structure capable of suppressing light propagation.

The PC portion 201 is incorporated in a material showing a deformation in shape by an externally applied energy. The PC portion 201 can be prepared by an already reported and known method such as lithography or etching, and the method of preparation is not particularly limited. Such preparation technology is utilized to process a part of the aforementioned material showing a deformation in shape by the externally applied energy. A non-processed portion is used as a support portion 202, thereby obtaining an optical element integrated with the PC portion 201.

As explained in the foregoing, the optical element of the present embodiment is constituted in a state where the PC portion 201 and the support portion 202 are integrated. Therefore, when the support portion 202 causes a deformation by the externally applied energy, the PC portion 201 correspondingly deforms in shape. In this case, as in the first embodiment of the present invention, the deformation takes place in the direction parallel to the interfacial plane with the PC portion.

As explained in the first embodiment, since the frequency of the light corresponding to a photonic band structure can be determined from the lattice shape and the lattice pitch mentioned above, such change in the shape of the PC portion 201 allows to change the lattice shape or the lattice pitch, thereby controlling the frequency characteristics.

Thus, the optical element of the present embodiment can control the lattice shape or the lattice pitch of the crystal by externally applied energy, whereby an element having a desired photonic band structure can be provided with a simple configuration. In the present embodiment, as a portion showing a periodic change of the refractive index is integrally prepared on a support portion for supporting the portion showing the periodic change of the refractive index, there can be obtained a compact apparatus configuration. Also, regulation of the photonic band structure is rendered possible with a compact configuration. Furthermore, this optical element can be prepared inexpensively, because it is formed from the same material. Further, since in such regulating operation the optical element itself is moved by the externally applied energy, it is possible to increase the response speed of the element.

According to the present invention, there can be realized a periodic structure controlling method allowing to control a periodic structure showing a periodic change of the refractive index (photonic band structure) with a simple configuration, and an optical element having periodic structure control means.

In the following there will be explained examples of the present invention.

EXAMPLE 1

In Example 1, there will be explained an example of a configuration in which an optical element of the present example is applied to a mirror. FIG. 7 is a view showing an example of a configuration of a mirror in which the optical element of the present example is applied. In FIG. 7, there are shown a PC 101, a substrate 102 and a driver 501.

FIGS. 3A and 3B show a specific configuration of the PC 101 of the present example, employing the configuration of the first embodiment of the present invention.

As a constituent material, there is utilized PMMA (polymethyl methacrylate) having a refractive index of 1.49. As shown in FIG. 3A, the PC 101 is formed, by the EB lithography, in a two-dimensional rod-shaped crystal having a honeycomb structure. However, the crystal structure is not limited thereto.

FIG. 3B is a cross-sectional view along the line 3B—3B in FIG. 3A. As illustrated in these figures, the PC 101 is constituted of a rod portion showing a periodic change in the refractive index, and a support portion for the rods. In the present example, the support portion is made sufficiently thin, in order for the range of the deformation of the PC 101 to be concentrated in the support portion, thereby causing an efficient change in the lattice pitch of the rod portion.

In the present example, a piezoelectric element is employed as the substrate 102. After the PC 101 is formed using the above-explained method, the substrate 102 and the PC 101 are adhered to obtain an optical element. The substrate 102, in response to a voltage signal from the driver 501, elongates or contracts in the direction of the junction plane between the PC 101 and the substrate 102. The PC 101, being closely adhered to the substrate 102, can change the shape integrally with the elongation or contraction of the substrate 102.

In such configuration, when a light enters from the direction parallel to the junction plane of the PC 101 and the substrate 102, the driver 501 was used to cause an elongating-contracting motion of the substrate 102 in a direction of the junction plane with the PC 101 for regulating the photonic band structure so as to suppress the wavelength of the incident light, and it could be confirmed that the incident light was reflected efficiently.

EXAMPLE 2

In Example 2, there will be explained an example of a configuration in which an optical element of the present example is applied to a mirror. FIG. 7 is a view showing an example of a configuration of a mirror in which the optical element of the present example is applied. In FIG. 7, there are shown a PC 101, a substrate 102 and a driver 501.

FIGS. 4A and 4B show a specific configuration of the PC 101 of the present example, employing the configuration of the first embodiment of the present invention.

As a constituent material, there is utilized PMMA (polymethyl methacrylate) having a refractive index of 1.49. As shown in FIG. 4A, the PC 101 is formed, by the EB lithography, in a two-dimensional rod-shaped crystal having a honeycomb structure. However, the crystal structure is not limited thereto. FIG. 4B is a cross-sectional view along the line 4B—4B in FIG. 4A. As illustrated in these figures, the PC 101 is constituted of rod portions, showing a periodic change in the refractive index, present in an isolated manner on the substrate 102.

In the present example, a piezoelectric element is employed as the substrate 102. In the present example, after a PMMA film coat was applied on the substrate 102, the above-explained method was used to obtain an optical element in which the substrate 102 and the PC 101 are adhered. The substrate 102, in response to a voltage signal from the driver 501, elongates or contracts in the direction of the junction plane between the PC 101 and the substrate 102. The PC 101, being closely adhered to the substrate 102, can change the shape integrally with the elongation or contraction of the substrate 102.

In such configuration, when a light enters from the direction parallel to the junction plane of the PC 101 and the substrate 102, the driver 501 was used to cause an elongating-contracting motion of the substrate 102 in the direction of the junction plane with the PC 101 for regulating the photonic band structure so as to suppress the wavelength of the incident light, and it could be confirmed that the incident light was reflected efficiently.

EXAMPLE 3

In Example 3, there will be explained an example of a configuration in which an optical element of the present example is applied to a mirror. FIG. 7 is a view showing an example of a configuration of a mirror in which the optical element of the present example is applied. In FIG. 7, there are shown a PC 101, a substrate 102 and a driver 501.

FIGS. 5A and 5B show a specific configuration of the PC 201 of the present example, employing the configuration of the second embodiment of the present invention. The structure in present example is constructed so as to provide the deforming portion, namely the support portion 202, with an electric field substantially parallel to the periodic direction of the periodic structure of the PC 201.

The present example employs, as the PC portion 201 and the support portion 202, a piezoelectric element (PLZT, refractive index 2.5). As shown in FIG. 5A, the PC portion 201 is formed, by the EB lithography, in a two-dimensional rod-shaped crystal having a honeycomb structure. However, the crystal structure is not limited thereto FIG. 5B is a cross-sectional view along the line 5B—5B in FIG. 5A. As illustrated in these figures, it is constituted of the PC portion 201 of a rod shape, showing a periodic change in the refractive index, and the support portion 202.

In the optical element of the present example, electrodes 301, 302 are further prepared, as shown in FIGS. 5A and 5B, on the left and right ends of the support portion 202, with respect to the boundary plane of the PC portion 201 and the support portion 202. Since the support portion 202 is formed of a piezoelectric element, an application of voltage to the electrodes 301 and 302 allows the deformation in the support portion 202 to take place. In the present example, in response to a voltage signal entered from the driver 501, the support portion 202 elongates and contracts in the direction of the boundary plane of the PC portion 201 and the support portion 202. The PC portion 201, being integral with the support portion 202, can change the shape with the elongation or contraction of the support portion 202.

In such configuration, when a light enters from the direction parallel to the junction plane of the PC portion 201 and the support portion 202, the driver 501 was used to cause an elongating-contracting motion of the support portion 202 in the direction of the junction plane with the PC portion 201 for regulating the photonic band structure so as to suppress the wavelength of the incident light, and it could be confirmed that the incident light was reflected efficiently.

EXAMPLE 4

In Example 4, there will be explained an example of a configuration in which an optical element of the present example is applied to a mirror. FIG. 7 is a view showing an example of a configuration of a mirror in which the optical element of the present example is applied. In FIG. 7, there are shown a PC 101, a substrate 102 and a driver 501.

FIGS. 6A and 6B show a specific configuration of the PC 201 of the present example, employing the configuration of the second embodiment of the present invention. The structure in the present example is constructed so as to provide the support portion 202 with an electric field substantially perpendicular to the periodic direction of the periodic structure of the PC 201.

The present example employs, as the PC portion 201 and the support portion 202, a piezoelectric element (PLZT, refractive index 2.5). As shown in FIG. 6A, the PC portion 201 is formed, by an EB lithography, in a two-dimensional rod-shaped crystal having a honeycomb structure. However, the crystal structure is not limited thereto. FIG. 6B is a cross-sectional view along the line 6B—6B in FIG. 6A. As illustrated in these figures, it is constituted of the PC portion 201 of a rod shape, showing a periodic change in the refractive index, and the support portion 202.

In the optical element of the present example, electrodes 401, 402 are further prepared, as shown in FIGS. 6A and 6B, on the upper and lower ends of the support portion 202, with respect to the boundary plane of the PC portion 201 and the support portion 202. The electrodes are prepared by a sol-gel method. Since the support portion 202 is formed of a piezoelectric element, an application of voltage to the electrodes 401, 402 allows the deformation in the support portion 202 to take place. In the present example, in response to a voltage signal from the driver 501, the support portion 202 elongates and contracts in the direction of the boundary plane of the PC portion 201 and the support portion 202. The PC portion 201, being integral with the support portion 202, can change the shape with the elongation or contraction of the support portion 202.

In such configuration, when a light enters from the direction parallel to the junction plane of the PC portion 201 and the support portion 202, the driver 501 was used to cause an elongating-contracting motion of the support portion 202 in the direction of the junction plane with the PC portion 201 for regulating the photonic band structure so as to suppress the wavelength of the incident light, and it could be confirmed that the incident light was reflected efficiently.

The invention claimed is:

1. An optical element for reflecting or transmitting an incident light, said optical element comprising:
    a periodic structure in which refractive index is distributed periodically, said periodic structure comprising a plurality of rods and a support film for supporting the plurality of the rods; and
    a deforming portion, which deforms by external action, wherein said deforming portion is integrally arranged with said periodic structure along the periodic direction of said periodic structure, and is so constructed as to change the periodicity of said periodic structure by deforming in the periodic direction of said periodic structure.

2. The optical element according to claim 1, wherein said change in the periodicity is that in any one of the period, phase, duty and orientation of said periodic structure or in the combination thereof.

3. The optical element according to claim 1, wherein said deforming portion is positioned outside a path of reflecting or transmitting light of said optical element.

4. The optical element according to claim 1, wherein said deforming portion includes a member integrally joined to said periodic structure, and said member deforms in the direction parallel to the joining plane of said member with said periodic structure.

5. The optical element according to claim 1, wherein the support film deforms in a direction parallel to its plane.

6. The optical element according to claim 5, wherein the support film is the same as a member constituting said periodic structure.

7. The optical element according to claim 1, wherein said deforming portion elongates and contracts in at least one direction.

8. The optical element according to claim 1, wherein said deforming portion causes shear deformation in at least one direction.

9. The optical element according to claim 1, wherein said deforming portion is constituted of a piezoelectric element.

10. The optical element according to claim 9, wherein said deforming portion includes a pair of electrodes, and said pair of electrodes are so arranged as to provide said deforming portion with an electric field substantially parallel to the periodic direction of said periodic structure.

11. The optical element according to claim 9, wherein said deforming portion includes a pair of electrodes, and said pair of electrodes are so arranged as to provide said deforming portion with an electric field substantially perpendicular to the periodic direction of said periodic structure.

12. The optical element according to claim 1, wherein said periodic structure is of a multi-dimensional photonic crystal.

13. The optical element according to claim 12, wherein said periodic structure is of a two-dimensional photonic crystal, and is composed of a portion having a two-dimensional periodicity and a support portion for supporting the portion having the two dimension periodicity.

14. The optical element according to claim 12, wherein said periodic structure is of a two-dimensional photonic crystal, and is composed solely of a portion having a two-dimensional periodicity.

15. A mirror comprising the optical element according to claim 1, and means for switching reflective and transmissive properties of said periodic structure alternatively by providing said deforming portion of said optical element with external force.

16. An optical deflector comprising the optical element according to claim 1, and means for changing a light-propagating direction of said periodic structure by providing said deforming portion of said optical element with periodic external force.

17. A control method for an optical element having a periodic structure in which refractive index is distributed periodically, said periodic structure comprising a plurality of rods and a support film for supporting the plurality of the rods, the method comprising the steps of:

arranging a deforming portion which deforms by external action integrally with said periodic structure along the periodic direction of said periodic structure; and changing the periodicity of said periodic structure by causing deformation in the periodic direction of said periodic structure.

18. A periodically structured material comprising:

a periodic structure portion comprising a plurality of rods and a support film for supporting the plurality of the rods; and a substrate for deforming the periodic structure portion.

19. The periodically structured material according to claim 18, wherein the support film is capable of changing a lattice pitch of the rods with deformation of the substrate.

* * * * *

UNITED STATES PATENT AND TRADEMARK OFFICE
CERTIFICATE OF CORRECTION

PATENT NO. : 7,068,904 B2  
APPLICATION NO. : 10/522226  
DATED : June 27, 2006  
INVENTOR(S) : Takeaki Itsuji et al.

It is certified that error appears in the above-identified patent and that said Letters Patent is hereby corrected as shown below:

COLUMN 7:

Line 22, "present" should read --the present--.

COLUMN 8:

Line 44, "refractive" should read --a refractive--.

COLUMN 9:

Line 30, "two dimension" should read --two-dimensional--.

Signed and Sealed this

Twenty-sixth Day of December, 2006

JON W. DUDAS  
*Director of the United States Patent and Trademark Office*